(12) United States Patent
Somers et al.

(10) Patent No.: US 11,272,145 B2
(45) Date of Patent: Mar. 8, 2022

(54) CARGO MONITORING SYSTEM AND METHOD

(71) Applicant: BlackBerry Limited, Waterloo (CA)

(72) Inventors: Gregory William Somers, Kanata (CA); Sameh Ayoub, Kanata (CA); Christopher James Stubbs, Kanata (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/176,176

(22) Filed: Oct. 31, 2018

(65) Prior Publication Data

US 2020/0137360 A1    Apr. 30, 2020

(51) Int. Cl.
*H04N 7/18* (2006.01)
*G01H 17/00* (2006.01)
*G01P 15/14* (2013.01)

(52) U.S. Cl.
CPC ............. *H04N 7/188* (2013.01); *H04N 7/183* (2013.01); *G01H 17/00* (2013.01); *G01P 15/14* (2013.01)

(58) Field of Classification Search
CPC ........ H04N 7/188; H04N 7/183; H04N 7/181; H04N 5/144; G01H 17/00; G01P 15/14; G08B 13/19608; G08B 13/19695; G08B 13/196; G08B 13/19613; G08B 13/19628; G08B 13/1965; G08B 13/19684; G08B 21/18; B60R 11/04; B60R 2011/0003; B60R 2300/105; B60R 2300/406; B60R 2300/8006; B60R 2325/302; B60R 25/305; B60R 25/33; G01G 19/08
USPC ........................................................ 348/148
See application file for complete search history.

(56) References Cited

U.S. PATENT DOCUMENTS

| | | | |
|---|---|---|---|
| 5,917,433 A * | 6/1999 | Keillor | G08G 1/20 340/540 |
| 7,819,003 B2 * | 10/2010 | Breed | B60C 11/24 73/290 V |
| 9,151,692 B2 * | 10/2015 | Breed | B60C 11/24 |
| 10,330,483 B2 * | 6/2019 | Anderson | G01C 21/3453 |
| 2007/0133980 A1 | 6/2007 | Meyers et al. | |
| 2007/0241897 A1 * | 10/2007 | Knuepfer | B60R 25/00 340/568.1 |
| 2015/0254600 A1 * | 9/2015 | Murthy | G06Q 10/083 705/337 |
| 2016/0148440 A1 * | 5/2016 | Kwak | G07C 5/085 701/31.5 |

(Continued)

FOREIGN PATENT DOCUMENTS

WO    2016/146887 A1    9/2016

OTHER PUBLICATIONS

Extended European Search Report of EP Application No. 19202445.3 dated Apr. 3, 2020.

*Primary Examiner* — Nathnael Aynalem
(74) *Attorney, Agent, or Firm* — Trop, Pruner & Hu, P.C.

(57) ABSTRACT

A cargo monitoring system comprising a controller and an image-capturing device for capturing a first image of cargo in response to a first signal from the controller. The system includes a sensor for taking sensor readings in relation to the cargo and for transmitting the sensor readings to the controller. The controller is configured to send a second signal to the image-capturing device to cause the image-capturing device to capture a second image of the cargo if the controller determines from the sensor readings that a cargo-damaging event has occurred.

20 Claims, 8 Drawing Sheets

(56) References Cited

U.S. PATENT DOCUMENTS

| | | | |
|---|---|---|---|
| 2017/0267159 A1* | 9/2017 | Bruhn | B60P 7/0861 |
| 2017/0349166 A1* | 12/2017 | Anderson | B60W 30/02 |
| 2017/0351255 A1 | 12/2017 | Anderson et al. | |
| 2017/0372262 A1* | 12/2017 | Haney | G06Q 10/0833 |
| 2018/0052462 A1* | 2/2018 | Arena | G05D 1/0094 |
| 2019/0025097 A1* | 1/2019 | Rusignuolo | F25D 29/003 |

\* cited by examiner

CARGO MONITORING SYSTEM AND METHOD

TECHNICAL FIELD

The present technology relates generally to cargo tracking and monitoring and, in particular, to systems and methods for detecting potential damage to cargo.

BACKGROUND

Various technologies exist for tracking and monitoring cargo and cargo containers during transport or shipment. These technologies utilize various types of sensors, location-determining devices such as GPS chips, and anti-theft monitors. These sensors, chips and monitors may be wirelessly linked to a remote computing device to enable a user of the remote computing device to remotely monitor the status of the cargo or container while it is being transported.

The existing technologies provide limited information about the status of the cargo or container, particularly in situations where the container is shaken or jolted enough to potentially cause damage to the cargo.

Improvements in this technology are thus highly desirable.

BRIEF DESCRIPTION OF THE DRAWINGS

Further features and advantages of the present technology will become apparent from the following detailed description, taken in combination with the appended drawings, in which.

It will be noted that throughout the appended drawings like features are identified by like reference numerals.

DETAILED DESCRIPTION

Disclosed in this specification and illustrated in the drawings is a cargo monitoring system. Also disclosed is a method of monitoring cargo. The cargo may be carried, transported or shipped in a cargo container carried by any suitable vehicle such as a truck, semi-truck (tractor-trailer), van, car, train, boat, ship, aircraft or drone. The vehicle may be a manned vehicle (with a driver or pilot) or an unmanned vehicle, e.g. a self-driving truck, unmanned aerial vehicle or robotic vehicle having no human operator onboard.

Accordingly, one aspect of the present disclosure is a cargo monitoring system comprising a controller and an image-capturing device for capturing a first image of cargo in response to a first signal from the controller. The system includes a sensor for taking sensor readings in relation to the cargo and for transmitting the sensor readings to the controller. The controller is configured to send a second signal to the image-capturing device to cause the image-capturing device to capture a second image of the cargo if the controller determines from the sensor readings that a cargo-damaging event has occurred.

Another aspect of the present disclosure is a method of monitoring cargo, the method comprising capturing a first image of cargo using an image-capturing device in response to a first signal from a controller. The method involves taking sensor readings in relation to the cargo and transmitting the sensor readings to the controller. The method involves determining by the controller if the sensor readings are indicative of a cargo-damaging event. The method further involves sending a second signal to the image-capturing device to cause the image-capturing device to capture a second image of the cargo subjected to the cargo-damaging event.

The details and particulars of these aspects of the technology will now be described below, by way of example, with reference to the drawings.

Figure 1:
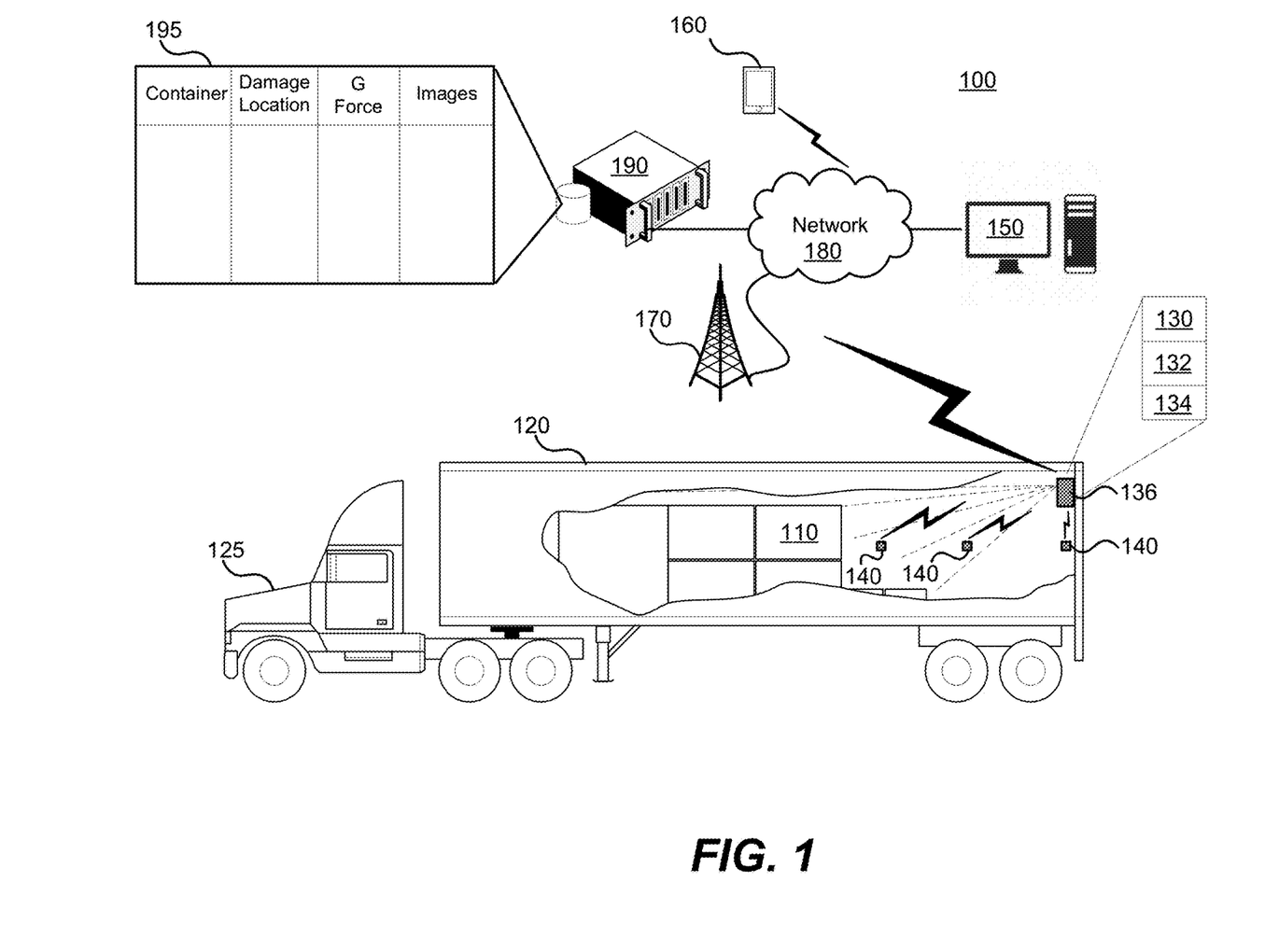
FIG. 1 is a depiction of a cargo monitoring system according to a first embodiment of the present invention.

In the embodiment depicted in FIG. 1, a cargo monitoring system generally denoted by reference numeral 100 may be used to monitor cargo 110 and/or a cargo container 120. It will be appreciated that the cargo container may be any suitable size or shape. In this example illustrated in FIG. 1, the cargo container 120 (hereinafter simply "container") is transported by a truck 125. It will be appreciated that other vehicles may be used to transport the container, e.g. a ship, a train, an airplane, a drone, etc.

The system 100 depicted in FIG. 1 includes a controller 130 and an image-capturing device 132 for capturing a first image of the cargo 110 in response to a first signal from the controller 130. The controller 130 may be a microcontroller, microprocessor, application-specific integrated circuit (ASIC), computer or any equivalent device. The image-capturing device 132 may be a camera, e.g. a digital camera capable of taking digital photographs. The digital camera may include CMOS or CCD sensors. The system 100 may also include a wireless transmitter 134 for transmitting images as will be explained in greater detail below. The controller 130, image-capturing device 132 and wireless transmitter 134 may be packaged as a single unit monitoring module 136 capable of communicating with one or more sensors 140 and then activating the image-capturing device 132 to capture one or more images of the cargo 110. Alternatively, the controller 130, the image-capturing device 132 and the wireless transmitter 134 could be packaged as separate units or it any suitable combination or subcombination. In one embodiment, the controller 130 is configured to cause the image-capturing device 132 to take a first image of the cargo 110 at the outset of the journey and a second image of the cargo 110 if the cargo 110 is subjected to an event that might have caused damage the cargo 110. In a variant, the controller 130 may cause the image-capturing device 132 to capture another image upon arrival at the destination, periodically during the journey, or at other predetermined or user-defined times and/or locations. Taking periodic images could be used, in some embodiments, to locate where a cargo-damaging event occurred that might not have been sensed by the sensors depending on the sensor thresholds. The images may also be analyzed with the sensor readings to adjust sensor thresholds. The images (e.g. photos) may be transmitted to cargo owners, shippers, courier companies, etc. to be used to demonstrate whether or not there was a cargo-damaging event during transit. This is useful to settle disputes amongst shippers, loaders/unloaders and cargo owners as to who is at fault for any damage to the cargo 110. Previously, without this technology, it was very difficult to determine responsibility for damage to cargo 110, i.e. without any evidence of damage occurring during shipment. The images may also be used as evidence for insurance claims and/or to produce various types of reports for cargo owners, transport companies, couriers, etc. in the scenario where the cargo is subjected to ongoing movement, which could eventually result in damage. It is possible that outwardly a box could look undamaged yet internally the contents may have been damaged The cargo monitoring system 100 depicted by way of example in FIG. 1 includes one or more sensors 140 configured to sense a potential cargo-damaging event by taking sensor readings in relation to the cargo 110 (i.e. collecting measurements such as acceleration). A potential cargo-damaging event for the purposes of this specification is any incident or occurrence that moves, jostles, shakes, jolts, jars or vibrates the container and/or the cargo 110 with sufficient force or acceleration such that the cargo 110 may be damaged. The sensor readings may be acceleration readings, force readings, rate of rotation readings, etc., which may be received by the controller 130 as either analog or digital signals. The sensor readings may be transmitted from the sensor(s) 140 to the controller 130 wirelessly or by wired connection.

The controller 130 is configured to receive and process the sensor readings from the sensor(s) 140 and to determine whether the sensor readings are sufficiently high (or low with respect to a threshold) to be indicative of potential damage to the cargo 110 (i.e. a cargo-damaging event). The sensor readings may be compared by the controller 130 to a predetermined threshold to determine if the sensor readings are indicative of potential damage to the cargo 110. In a variant, the controller 130 may be configured to compare the sensor readings to a user-specified threshold, e.g. a threshold specified by the cargo owner, to determine if the sensor readings are indicative of potential damage to the cargo 110.

The controller 130, upon determining that the sensor readings are indicative of a potential cargo-damaging event, sends a second signal to the image-capturing 132 device to cause the image-capturing device 132 to capture a second image of the cargo 110. In some embodiments, the sensor 140 may be a motion sensor. For example, the motion sensor may be an accelerometer providing acceleration measurements. The motion sensor may be a gyroscope providing rates of rotation. In another embodiment, the system uses both an accelerometer and a gyroscope. In yet another embodiment, the system uses multiple accelerometers and/or multiple gyroscopes. A combination of accelerometers and gyroscopes may be used to provide more information about the motion of the cargo container 120. In another embodiment, the sensor may be an acoustic wave sensor to detect sound waves indicative of damage to the cargo. An optical, microwave or ultrasound sensor may also be used to detect motion. A machine vision subsystem may also be used to identify the cargo and to detect motion of the cargo. The machine vision subsystem utilizes a camera for capturing images and a processor executing object-recognition code that is programmed to process the images to identify objects in the images.

As noted above, in one embodiment, the image-capturing device 132 is a camera in which case the first and second images are photographs. Alternatively, the image-capturing device 132 may be an X-ray scanner, an infrared camera, thermal imaging camera, methane camera, time-of-flight (ToF) sensor, or an ultrasound imager. The thermal imaging camera could provide a heat map indicative of zones of excessive heat, possibly caused by excessive friction. In one embodiment, the cargo monitoring system 100 may include multiple image-capturing devices 132. The controller 130 may trigger all image-capturing devices 132 in response to a sensed event or, alternatively, the controller 130 may trigger only one or a subset of the image-capturing devices 132.

In the embodiment depicted in FIG. 1, the cargo monitoring system 100 comprises a cargo container 120 to which the one or more sensors 140 are affixed in order to detect motion of the container 120. The container 120 may be, for example, an intermodal freight container, i.e. a standardized shipping container designed for intermodal freight transport via ship, rail and truck. The sensor 140 is connected, i.e. mounted or otherwise affixed, to the cargo container 120. In one embodiment, the sensor 140 is an accelerometer or a gyroscope attached to the container. Alternatively, the system 100 may include a combination of accelerometers and gyroscopes attached to the container 120. Alternatively, the sensor 140 may be an acoustic wave sensor, an ultrasonic or microwave motion sensor.

In the embodiment depicted in FIG. 1, the wireless transmitter 134 of the system 100 transmits the first and second images to one or more remote computing devices 150, 160 via a base transceiver station 170 and a data network 180. The remote computing devices 150, 160 may be the desktop computer 150 and the handheld mobile communication device 160 shown by way of example in the figure but these may be any other computing devices such as a laptop computer, tablet, etc. It will be appreciated that although two remote computing devices 150, 160 are shown in this example illustration, the images may be transmitted to only a single remote computing device or to more than two remote computing devices. The remote computing devices 150, 160 may be associated with, or operated by, the shipping company, courier company, cargo owner, the seller of goods being transported, the buyer of goods being transported, an insurer, or any other interested party. Optionally, as shown in FIG. 1, the system may include a cargo monitoring server 190 having a server memory that stores a database of cargo-related information. For example, the cargo-related information may include the container identifier, the location where a potential cargo-damaging event was sensed, the force, e.g. G force, measured by the sensor(s), and the images of the cargo, e.g. the first and second images depicting the cargo before and after the cargo-damaging event. This information is presented solely as an example to illustrate how the server can store cargo-related information for different containers owned or operated by a particular shipping company or other entity.

The system 100 may optionally include a local memory integrated with the controller 130 for storing location data of a cargo-damaging location where the cargo-damaging event was sensed. In one embodiment, the memory in the controller 130 is accessible by data bus or wireless connection by a vehicle system of a vehicle (e.g. the truck 125) transporting the cargo 110 to enable avoidance of the location on a subsequent trip. For example, the vehicle system may be a navigation system or an autonomous driving system.

In one embodiment, the controller 130 cooperates with the vehicle system of the vehicle transporting the cargo to provide an immediate warning to a driver of the vehicle that the cargo is being subjected to excessive movement. The warning may be visual, audible, tactile or any combination thereof. The warning may recommend to the driver to slow down, change lanes, turn less sharply, etc.

The system may further comprise a wireless transmitter for transmitting location data of a cargo-damaging location where the cargo-damaging event was sensed to other vehicles to enable the other vehicles to avoid the location or to provide a warning to drive more slowly or carefully when passing the location. The warning may be to drive in a specific lane to avoid a pothole. The location data may be coordinates of latitude and longitude.

Figure 2:
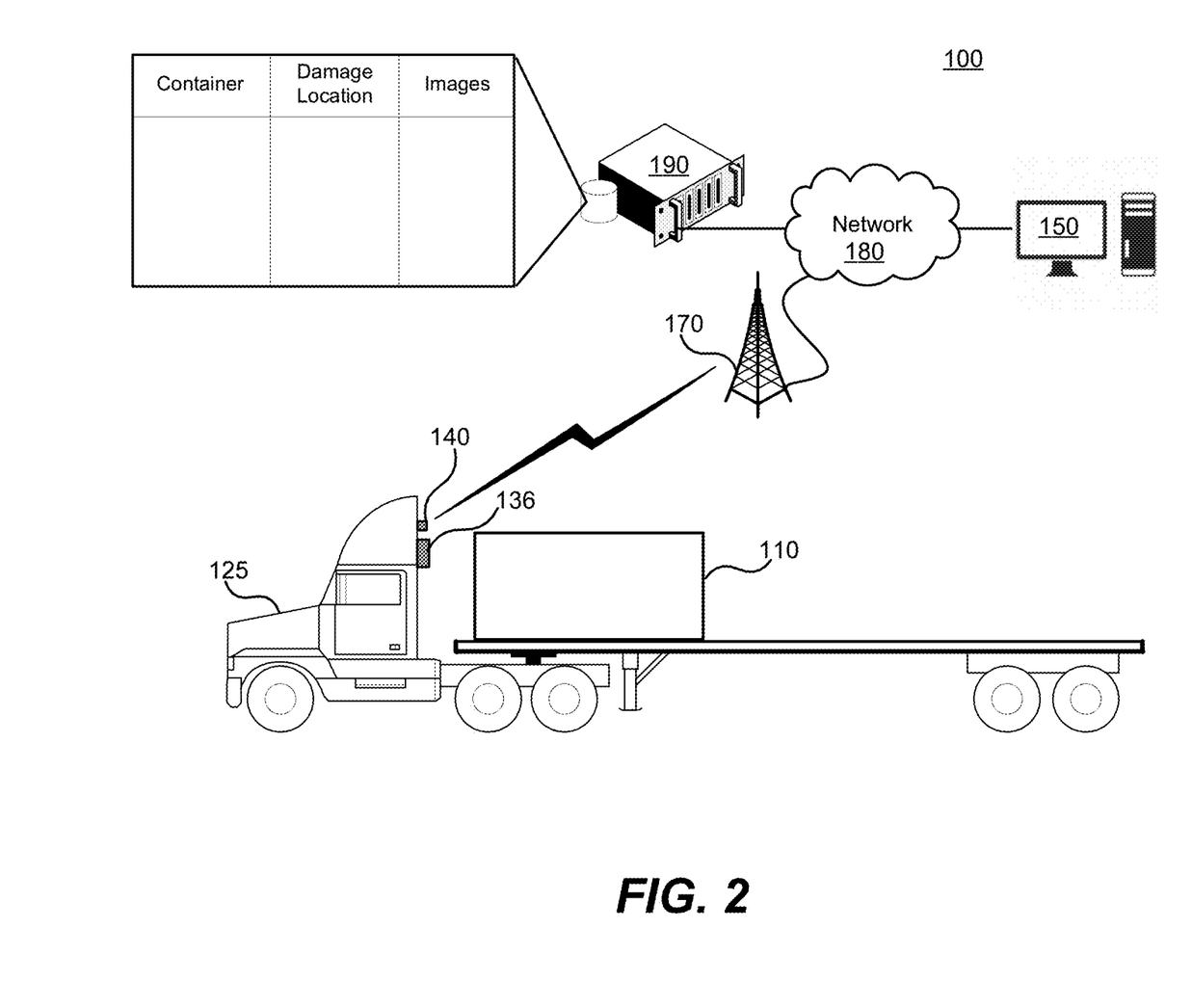
FIG. 2 is a depiction of a cargo monitoring system according to a second embodiment of the present invention.

FIG. 2 is a depiction of a cargo monitoring system 100 according to a second embodiment of the present invention in which the sensor(s) 140 and the monitoring module 136 containing the controller, the image-capturing device and the wireless transmitter are mounted to a rear portion of a flatbed truck 125. One or more sensors on the bed of the truck may also be provided in another embodiment. The cargo 110 is carried on the flatbed trailer instead of inside a container in this example. In this embodiment, the sensor 140 detects movements of the cargo and cooperates with the controller, image-capturing device 132 and wireless transmitter 134 to capture and transmit images to the remote computing device 150 and/or server 190 as previously described.

Figure 3:
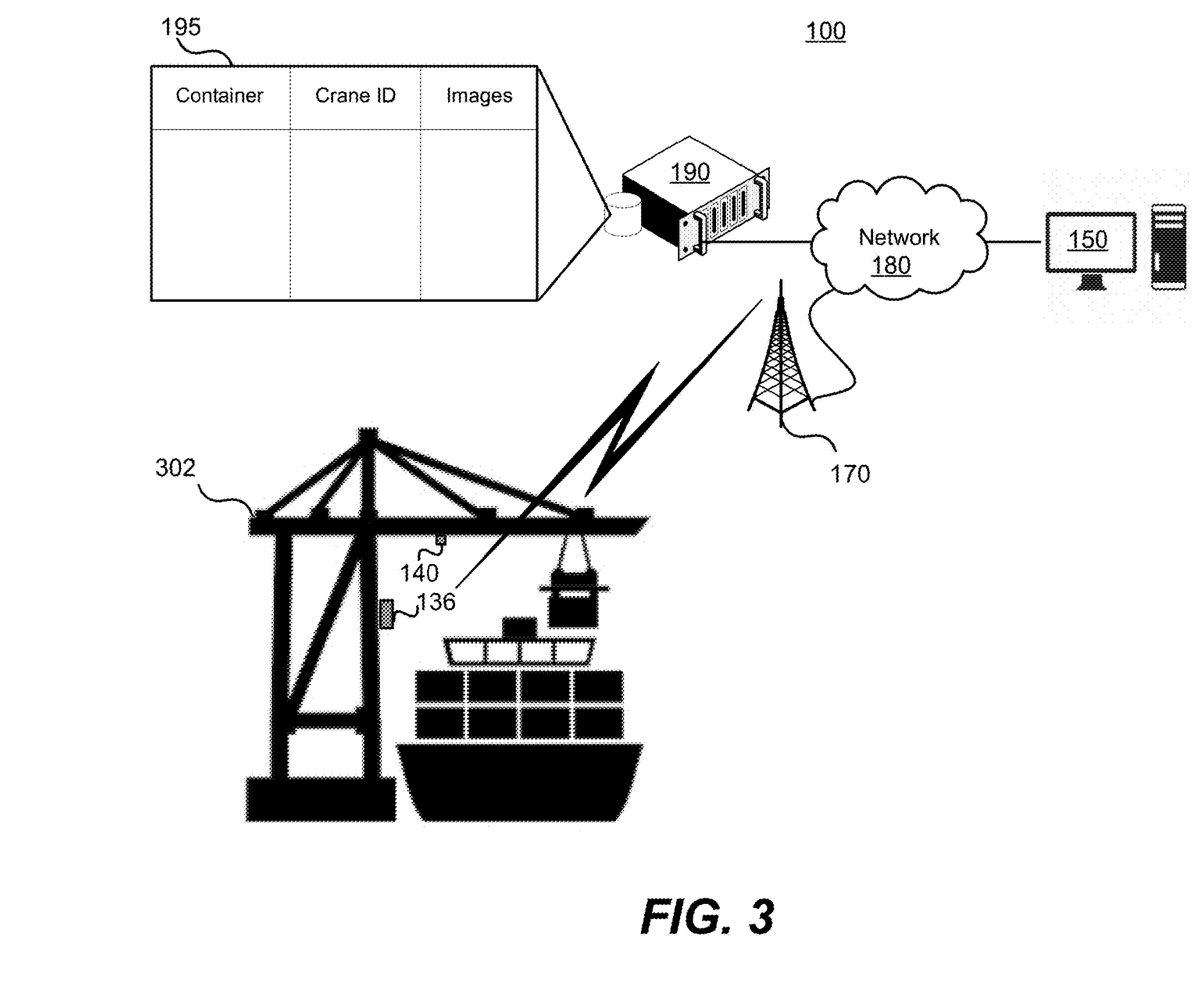
FIG. 3 is a depiction of a cargo monitoring system according to a third embodiment of the present invention.

FIG. 3 is a depiction of a cargo monitoring system 100 according to a third embodiment of the present invention. As a further example, the system of FIG. 3 monitors cargo being loaded and unloaded by a dockside crane 300 into and out of a container ship. In this example, the sensor(s) 140 and the monitoring module 136 containing the controller, the image-capturing device and the wireless transmitter are mounted to the crane 300. The sensors and module may be affixed to a separate structure beside the crane. Sensors may be affixed to the containers too. The system may be used to monitor cargo as cargo is loaded and unloaded from ships as illustrated but also any other suitable transport vehicles such as trains or trucks. In this example, the cargo-monitoring system monitors for potential cargo-damaging events such as for example cargo being dropped or cargo being piled too high.

Figure 4:
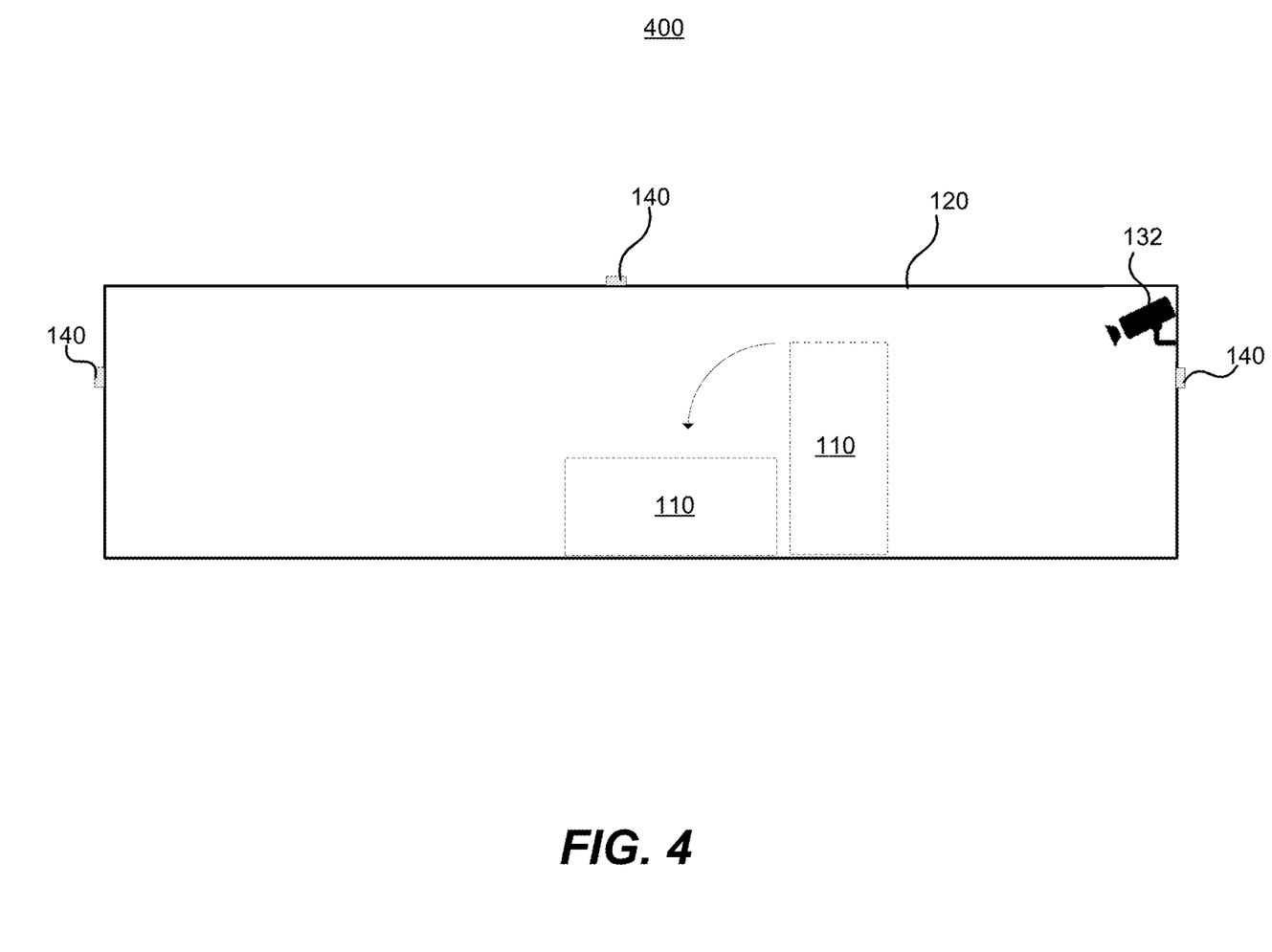
FIG. 4 is a depiction of a container having external sensors and an internal camera as one example implementation.

FIG. 4 is a depiction of one example of a cargo-monitoring container 400. The cargo-monitoring container 400 in this example implementation has a container 120, multiple externally mounted sensors 140 and a single internally mounted camera 132. Any suitable camera can be used in this container, e.g. a static fisheye camera or a moving surveillance camera. The camera can be a camera that captures fixed images, a video camera, a thermal imaging camera, an infrared camera, etc.

Figure 5:
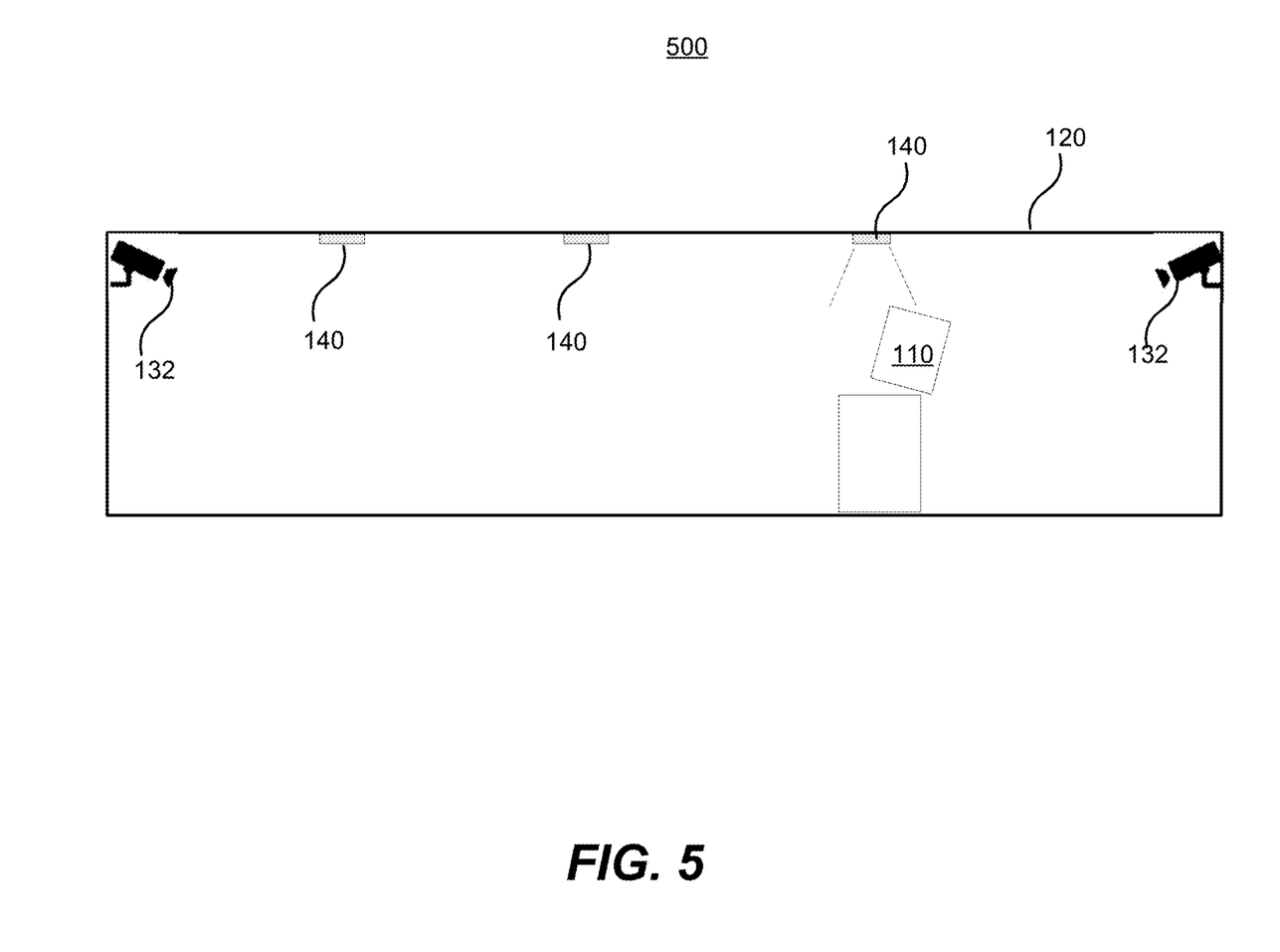
FIG. 5 is a depiction of a container having internal sensors and two internal cameras as another example implementation.

FIG. 5 is a depiction of another example of a cargo-monitoring container 500. The cargo-monitoring container 500 in this example implementation has internal sensors 140 and two internal cameras 132.

Figure 6:
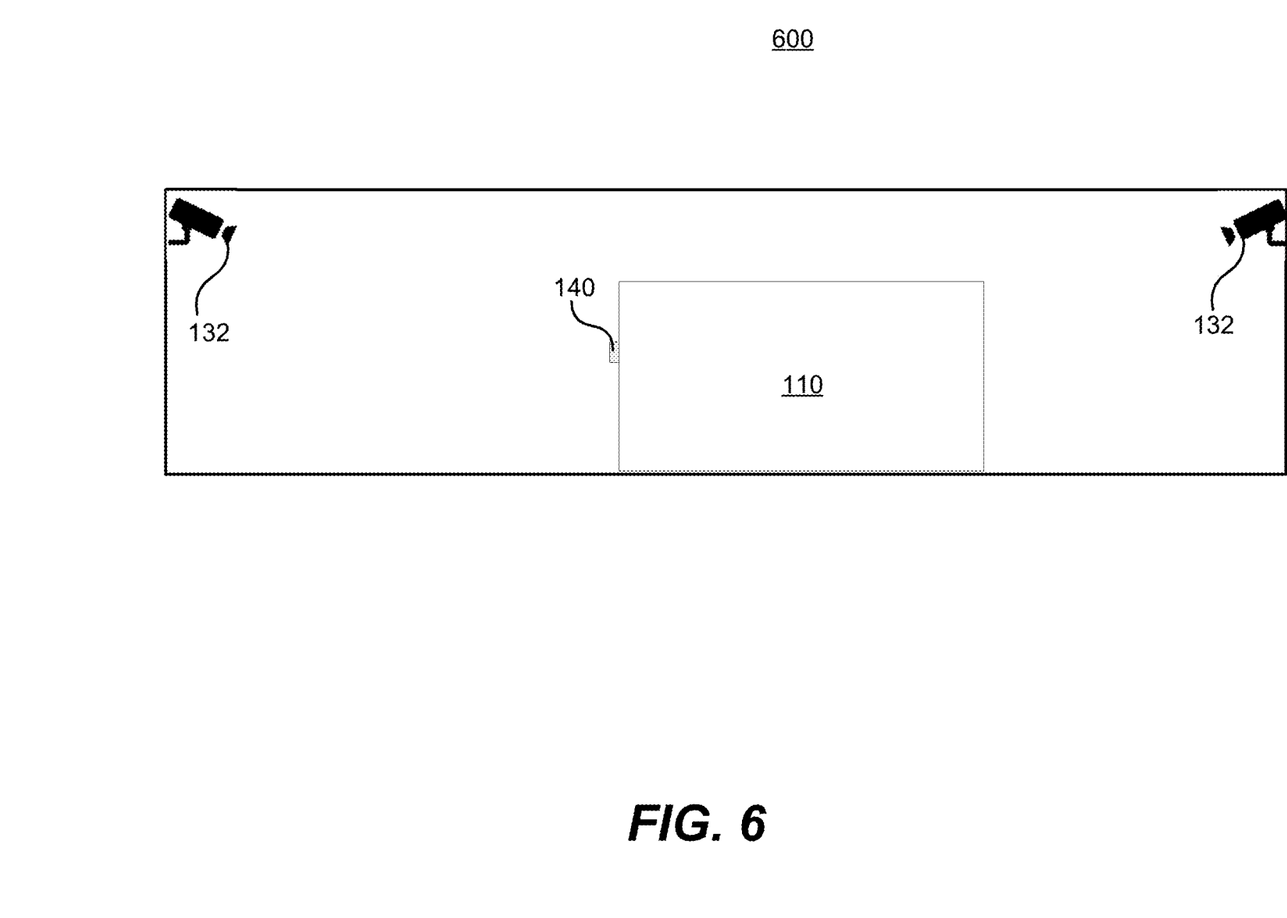
FIG. 6 is a depiction of a detachable sensor affixed to a box carried within a container.

FIG. 6 is a depiction of another example of a cargo-monitoring system in which a detachable sensor 140 is affixed directly to the cargo 110 (e.g. to a box) carried within the container 120. In this system 600, the cameras 132 are internally mounted to inner surfaces of the container to captures photos of the cargo 110 based on wireless signals from the detachable sensor 140. The detachable sensor can be affixed directly to a particular box or package, on the outside or inside of the box or package, to obtain direct readings of the forces, vibrations, etc. that impinge on the box or package to which the detachable sensor is affixed. For example, the detachable sensor may be used for especially fragile cargo. The detachable sensor may be used to supplement the container's sensors. The detachable sensor may be affixed by the shipper or cargo owner to provide independent or additional monitoring.

Figure 7:
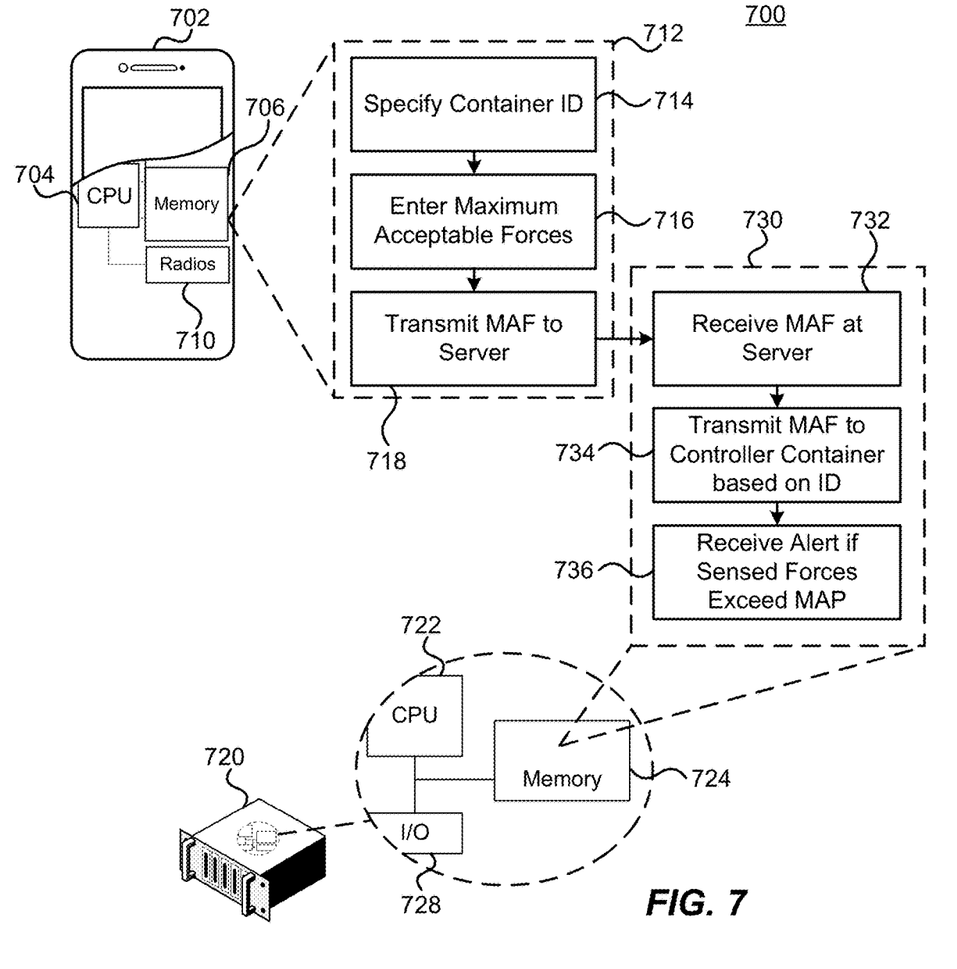
FIG. 7 is a depiction of a system and method for defining maximum acceptable forces on cargo to be transported.

FIG. 7 is a depiction of a system and method for enabling a cargo owner or shipper to define maximum acceptable forces on cargo to be transported. If the sensed forces exceed the maximum acceptable forces defined by the cargo owner or shipper, the system alerts the cargo owner or shipper. In the system 700 depicted by way of example in FIG. 7, a first user device (e.g. a mobile device 702) has a processor (CPU) 704, a memory 706, and radio transceivers 710. The device 702 stores and executes a client application 712 that is programmed (coded) to enable a user to specify a container ID (714), enter maximum acceptable forces (716) and to transmit the maximum acceptable forces to a server 720. The server 720 has a CPU 722, memory 724 and I/O ports 728 for data connection with a data network such as the Internet. The server 720 stores and executes a server application 730 to receive the maximum acceptable forces (732), transmit the maximum acceptable forces to a controller at the container based on the ID of the container (734), and to receive alerts if sensed forces exceed the maximum acceptable forces (736).

In another implementation of this technology, the cargo-monitoring system (e.g. its controller) can be trained using sensor data collected on multiple journeys or from a fleet of vehicles or containers having comparable sensors. The data can be used to adjust or calibrate the controller's threshold for flagging or declaring a cargo-damaging event or to determine which actions, alerts, warnings, are taken by the controller or other components of the cargo-monitoring system. During the training process, the collected or shared data can be used to define or identify how various ranges of sensor readings are to be interpreted and used by the controller.

Figure 8:
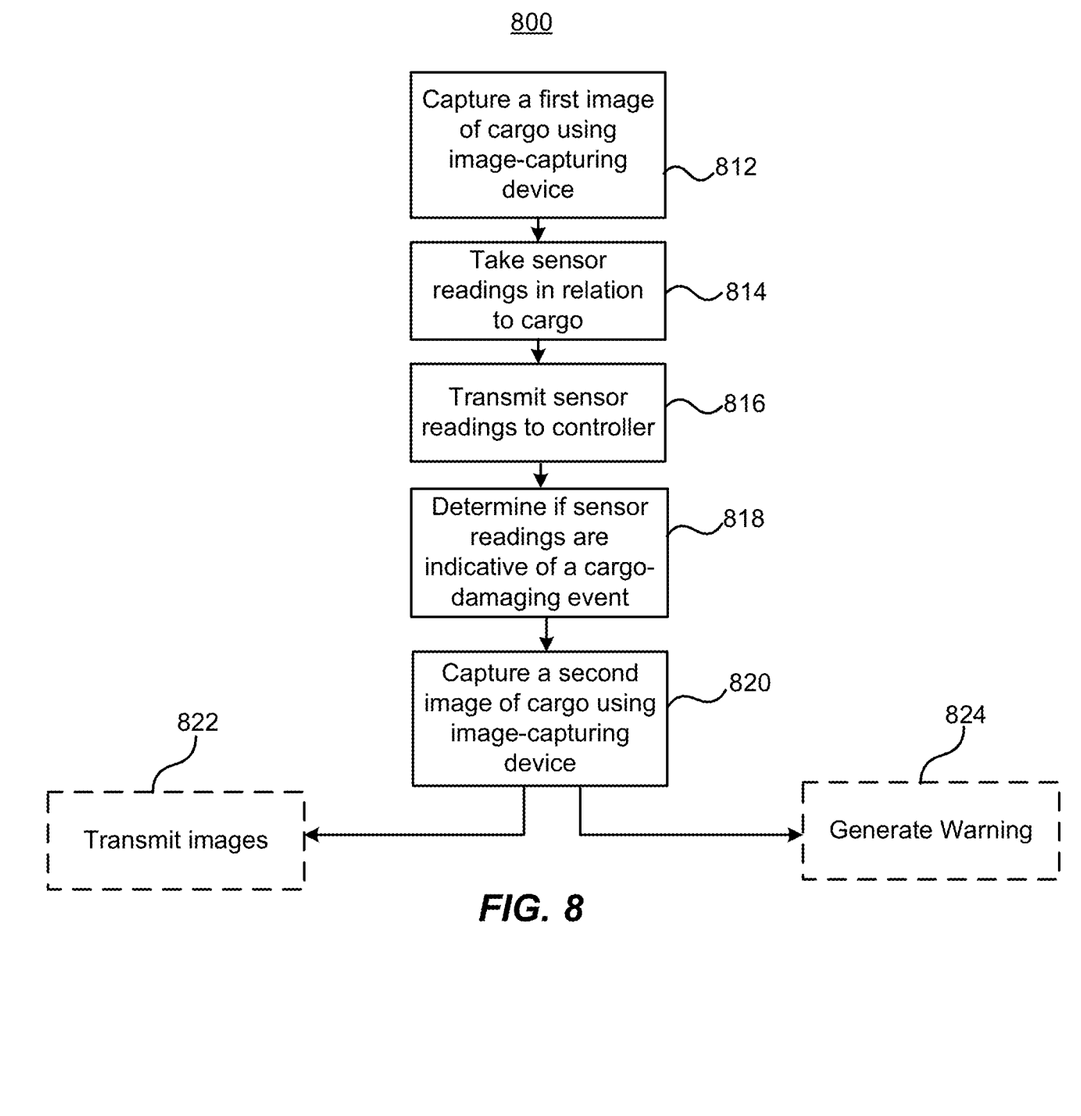
FIG. 8 is a flowchart of a method of monitoring cargo.

Another aspect of the disclosure is a method of monitoring cargo. As depicted in FIG. 8, the method 800 entails steps, acts or operations of capturing (812) a first image of cargo using an image-capturing device in response to a first signal from a controller. The method involves taking sensor readings (814) of, or in relation to, the cargo and transmitting the sensor readings to the controller and transmitting (816) sensor readings to the controller. Taking readings of, or in relation to the cargo, can be accomplished using sensors, transducers, detectors or any such device to obtain readings, signals, data or measurements relating to forces, accelerations, vibrations, movements, heat, or any other phenomenon that may damage the cargo. The method involves determining (818) by the controller if the sensor readings are indicative of a potential cargo-damaging event. The method further involves sending a second signal to the image-capturing device to cause the image-capturing device to capture (820) a second image of the cargo subjected to the cargo-damaging event.

In one implementation of the method, the sensor is an accelerometer. In another implementation, the sensor can be an acoustic wave sensor. Another suitable type of sensor may be used. The method may also be performed using multiple sensors, either multiple sensors of the same type or different types of sensors.

In one implementation of the method, the image-capturing device is a camera and the first and second images are photographs. In other implementations, the image-capturing device may be an X-ray scanner, an infrared camera, or an ultrasound imager. Another suitable imaging technology may be used. Multiple image-capturing devices may be used. The multiple image-capturing devices may be of the same type or different types.

The method may involve a further step 822 of transmitting one or both of the first and second images to a remote computing device, e.g. using a wireless transmitter such as a cellular transmitter. The method may involve a further step at the remote computing device of receiving, importing or uploading the photographs to generate shipping reports, status updates, damage reports, insurance claims or other similar documents.

The method may involve a further step of storing location data of a cargo-damaging location where the cargo-damaging event was sensed. In one implementation, the location data may be stored in a memory that is accessible by a vehicle system of a vehicle transporting the cargo to enable avoidance of the location on a subsequent trip.

The method may further comprise a step of providing an immediate warning 824 to a driver of a vehicle carrying the cargo that the cargo is being subjected to excessive movement and thus potential damage. The driver may be prompted to slow down, to change lanes, to brake less aggressively or to turn a corner less rapidly, or any suitable combination thereof. For a self-driving vehicle, the warning may be received and automatically processed by the autonomous vehicle computer to take corrective measures on its own to minimize further damage to the cargo, e.g. by slowing down, changing lanes, etc.

The method may further involve transmitting the location data of a cargo-damaging location where the cargo-damaging event was sensed to other vehicles to enable the other vehicles to avoid the location. The other vehicles may be, for example, part of a group of vehicles belonging to the same transport/shipping company.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed, permanent, non-volatile or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

It is to be understood that the singular forms "a," "an," and "the" include plural referents unless the context clearly dictates otherwise. Thus, for example, reference to "a processor" includes reference to one or more of such processors.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A cargo monitoring system comprising:
a controller;
an image-capturing device for capturing a first image of cargo in response to a first signal from the controller;
a detachable sensor attached to the cargo for taking sensor readings indicative of a cargo-damaging event in relation to the cargo to which the sensor is attached and for transmitting the sensor readings to the controller;
wherein the controller is configured to send a second signal to the image-capturing device to cause the image-capturing device to capture a second image of the cargo if the controller determines from the sensor readings that a potential cargo-damaging event has occurred; and
a wireless transceiver for receiving a threshold from a remote computing device wherein the threshold is sent to the controller based on a container identifier of a cargo container in which the cargo is located, wherein the controller is configured to cooperate with the wireless transceiver to send an alert to the remote computing device in response to sensing, by the detachable sensor, that the threshold has been exceeded for the container identifier.

2. The system of claim 1 comprising a container sensor that is connected to the cargo container.

3. The system of claim 1 wherein the detachable sensor is an accelerometer.

4. The system of claim 1 wherein the detachable sensor is an acoustic wave sensor.

5. The system of claim 1 wherein the image-capturing device is a camera and wherein the first and second images are photographs.

6. The system of claim 1 wherein the image-capturing device is selected from the group consisting of an X-ray scanner, an infrared camera, and an ultrasound imager.

7. The system of claim 1 wherein the wireless transceiver is configured to transmit one or both of the first and second images to the remote computing device.

8. The system of claim 1 wherein the threshold is a maximum acceptable force.

9. The system of claim 8 further comprising a memory for storing location data of a cargo-damaging location where the cargo-damaging event was sensed wherein the memory is accessible by a vehicle system of a vehicle transporting the cargo to enable avoidance of the location on a subsequent trip.

10. The system of claim 1 wherein the controller cooperates with a vehicle system of a vehicle transporting the cargo to provide an immediate warning to a driver of the vehicle that the cargo is being subjected to excessive movement.

11. The system of claim 1 wherein the wireless transceiver is configured to transmit location data of a cargo-damaging location where the cargo-damaging event was sensed to other vehicles to enable the other vehicles to avoid the location.

12. A method of monitoring cargo, the method comprising:
   capturing a first image of cargo using an image-capturing device in response to a first signal from a controller;
   taking sensor readings indicative of a cargo-damaging event in relation to the cargo using a detachable sensor attached to the cargo;
   transmitting the sensor readings to the controller;
   determining by the controller if the sensor readings are indicative of a cargo-damaging event;
   sending a second signal to the image-capturing device to cause the image-capturing device to capture a second image of the cargo subjected to the cargo-damaging event;
   wirelessly receiving a threshold from a remote computing device wherein the threshold is sent to the controller based on a container identifier of a cargo container in which the cargo is located; and
   wirelessly transmitting an alert to the remote computing device in response to sensing, by the detachable sensor, that the threshold has been exceeded.

13. The method of claim 12 wherein the threshold is a maximum acceptable force and wherein the detachable sensor is an accelerometer or an acoustic wave sensor.

14. The method of claim 12 wherein the image-capturing device is a camera and wherein the first and second images are photographs.

15. The method of claim 12 wherein the image-capturing device is selected from the group consisting of an X-ray scanner, an infrared camera, and an ultrasound imager.

16. The method of claim 12 further comprising transmitting one or both of the first and second images to the remote computing device.

17. The method of claim 12 further storing location data of a cargo-damaging location where the cargo-damaging event was sensed.

18. The method of claim 17 wherein the location data is stored in a memory that is accessible by a vehicle system of a vehicle transporting the cargo to enable avoidance of the location on a subsequent trip.

19. The method of claim 12 further comprising providing an immediate warning to a driver of a vehicle carrying the cargo that the cargo is being subjected to excessive movement.

20. The method of claim 12 further transmitting location data of a cargo-damaging location where the cargo-damaging event was sensed to other vehicles to enable the other vehicles to avoid the location.

* * * * *